(12) United States Patent
Iijima

(10) Patent No.: US 8,030,378 B2
(45) Date of Patent: Oct. 4, 2011

(54) HEAT CURING SILICONE RUBBER COMPOUND COMPOSITION

(75) Inventor: Hiroyoshi Iijima, Tokyo (JP)

(73) Assignee: Momentive Performance Materials Japan LLC, Tokyo (JP)

( * ) Notice: Subject to any disclaimer, the term of this patent is extended or adjusted under 35 U.S.C. 154(b) by 0 days.

(21) Appl. No.: 12/735,084

(22) PCT Filed: Dec. 26, 2008

(86) PCT No.: PCT/JP2008/073970
§ 371 (c)(1),
(2), (4) Date: Jun. 14, 2010

(87) PCT Pub. No.: WO2009/084733
PCT Pub. Date: Jul. 9, 2009

(65) Prior Publication Data
US 2011/0118392 A1    May 19, 2011

(30) Foreign Application Priority Data

Dec. 27, 2007 (JP) ................... 2007-335682

(51) Int. Cl.
*C08K 5/34* (2006.01)
*C08K 5/3412* (2006.01)
*C08K 5/3415* (2006.01)
*C08K 5/43* (2006.01)
*C08K 3/36* (2006.01)

(52) U.S. Cl. ............ 524/99; 524/104; 524/168; 524/493

(58) Field of Classification Search .................... 524/99, 524/104, 168, 493
See application file for complete search history.

(56) References Cited

U.S. PATENT DOCUMENTS

| | | | |
|---|---|---|---|
| 2006/0058452 A1 | 3/2006 | Sakamoto et al. | |
| 2009/0018261 A1* | 1/2009 | Srikanth et al. | 524/588 |
| 2010/0267979 A1* | 10/2010 | Bauer et al. | 556/479 |

FOREIGN PATENT DOCUMENTS

| | | |
|---|---|---|
| JP | 2002-146178 | 5/2002 |
| JP | 2002-363294 | 12/2002 |
| JP | 2003-519281 | 6/2003 |
| JP | 2004-331738 | 11/2004 |
| JP | 2005-298661 | 10/2005 |
| JP | 2005-344102 | 12/2005 |
| JP | 2005-350579 | 12/2005 |
| JP | 2006-83211 | 3/2006 |
| JP | 2006-225422 | 8/2006 |
| JP | 2006-265340 | 10/2006 |
| JP | 2006-321855 | 11/2006 |
| JP | 2007-321115 | 12/2007 |
| JP | 2008-222902 | 9/2008 |
| JP | 2008-231437 | 10/2008 |
| WO | WO 01/49925 A1 | 7/2001 |

* cited by examiner

*Primary Examiner* — Kriellion Sanders
(74) *Attorney, Agent, or Firm* — Flynn, Thiel, Boutell & Tanis, P.C.

(57) ABSTRACT

The present invention provides a silica-containing heat curing silicone rubber compound composition which can be produced safely and hardly suffers from inclusion of foreign substances. More specifically, when (A) 100 parts by weight of a polyorganosiloxane base polymer and (B) 1 to 100 parts by weight of a reinforcing silica are mixed together, (C) 0.05 to 80 ppm of an ionic liquid whose anionic component is bis(trifluoromethanesulfonyl)imide is added thereto.

2 Claims, No Drawings

HEAT CURING SILICONE RUBBER COMPOUND COMPOSITION

TECHNICAL FIELD

The present invention relates to a silica-containing heat curing silicone rubber compound composition which can be produced safely and hardly suffers from inclusion of foreign substances.

BACKGROUND ART

Although Silicone polymers have very low mechanical strength, it is effective to add silica thereto in order to improve the reinforcement. Many silicone rubber compositions therefore include silica. However, the silicone polymer and silica charge negatively due to friction, thus the mixture shows highly negatively-charged friction potential. From this reason, when obtaining the silicone rubber compound including silica, the compound is highly negatively charged in the course of mixing, and accidents such as ignition and explosion may possibly be caused by this electric potential. In particular, the blending of a dangerous substance such as a silane compound or hexamethyldisilazane causes a greater danger, and therefore usually the production is performed in a sealed mixer under an atmosphere substituted by nitrogen as a main way for avoiding the danger. However, it cannot be said that the safety is completely secured, in consideration of accidental errors such as human mistakes or malfunctions of measuring instruments; for example, the nitrogen substitution is not sufficiently completed due to some troubles, or even if the nitrogen substitution is completed, a small orifice is opened for adding additives.

In order to blend the silicone rubber composition including silica with a vulcanizing agent or a coloring agent in processing manufacturers, there exists generally a step of mixing them together by using rolls or in a mixer. In this case, due to negative friction charge generated during the mixing time, dust easily adsorbs and troubles in which the dust contaminates the product as foreign substances are often observed. In particular, most of silicone rubbers are molded products having a semi-transparent appearance and therefore, the inclusion of even a slight amount of the foreign substances would cause problems.

On the other hand, JP-A 2002-363294 proposes a method of addition of a cationic antistatic agent or deionized water, against the friction potential charged, in order to greatly increase an amount of filler. According to the method, however, many of the cationic antistatic agents do not have high heat resistance and thus lose their effects in several hours in a heating process at temperatures of, for example, 150° C. to 200° C. Further, at least about 1000 ppm of the blending amount thereof is required, which may possibly exert adverse effects on the properties or appearance of the rubber. Similarly, the deionized water or city water also evaporates due to heat generated during the mixing time, whereby stable effects cannot be expected, and moreover, if the water is blended with silica, silica disadvantageously agglomerates to form foreign substances.

As described above, according to the method described in JP-A 2002-363294, the problems to be solved by the present invention cannot be solved.

In addition, JP-A 2005-298661, JP-A 2005-344102, JP-A 2006-83211, JP-A 2006-225422, and JP-A 2006-265340 propose a blending of an ion-conductive compound such as a specific lithium salt and the silicone polymer, but any of them are different from the present invention in terms of a composition or curing mechanism as well as an amount of the ion conductive compound to be added and the intended object, and accordingly the problems to be solved by the invention cannot be also solved by these methods.

DISCLOSURE OF THE INVENTION

The present invention aims at solving the problems of the conventional technique, and providing a silica-containing heat curing silicone rubber compound composition which can be produced safely and hardly suffers from inclusion of foreign substances.

The present inventor has conducted detail studies as to means for achieving the above purpose through a relatively simple method. As a result, he has found that addition of a specific small amount of a specific ionic liquid is very effective when a polyorganosiloxane base polymer and a reinforcing silica are mixed together to produce a heat curing silicone rubber compound composition for achieving the above purpose, and has completed the present invention.

That is, the present invention relates to a heat curing silicone rubber compound composition comprising:
(A) 100 parts by weight of a polyorganosiloxane base polymer;
(B) 1 to 100 parts by weight of a reinforcing silica; and
(C) 0.05 to 80 ppm of an ionic liquid whose anionic component is bis(trifluoromethanesulfonyl)imide, prepared by adding component (C) when component (A) and component (B) are mixed together with each other.

According to the present invention, silica-blend heat curing silicone rubber compound compositions can be produced safely. In addition, the obtained silicone rubber compound is hardly contaminated. Further, the cured silicone rubbers maintain their inherent properties.

DETAILED DESCRIPTION OF THE INVENTION

The present invention will be described in detailed below.

The polyorganosiloxane base polymer, which is component (A), is a base polymer of the heat curing silicone rubber compound composition of the invention, and usually widely known polymers may be used. An organic group in the polyorganosiloxane base polymer can be exemplified as a substituted or unsubstituted monovalent hydrocarbon group, and may include unsubstituted hydrocarbon groups, for example, alkyl groups such as methyl group, ethyl group, propyl group, butyl group, hexyl group or dodecyl group; aryl groups such as phenyl group; and aralkyl groups such as β-phenylethyl group or β-phenylpropyl group; or substituted hydrocarbon groups such as chloromethyl group or 3,3,3-trifluoropropyl group. The methyl group is generally often used because of ease of synthesis. In particular, polydiorganosiloxanes in which at least two of organic groups attached to silicon atom in one molecule are vinyl groups are common, and linear ones are particularly preferably used. The polyorganosiloxane, however, is not limited thereto, and the use of, partially, polyorganosiloxanes having no vinyl groups, or branched or cyclic polyorganosiloxanes is possible.

Further, the silicone rubber in the heat curing silicone rubber compound composition of the invention can be obtained by utilizing a curing mechanism of known silicone rubbers, and curing is generally performed by cross-linking with an organic peroxide or cross-linking through addition reaction.

Commercially available organic peroxides can be used as a curing agent used in the cross-linking with the organic peroxide, and various kinds of organic peroxide vulcanizing agents such as benzoyl peroxide, 2,4-dichlorobenzoyl peroxide, p-methylbenzoyl peroxide, o-methylbenzoyl peroxide, dicumyl peroxide, cumyl-t-butyl peroxide, 2,5-dimethyl-2,5-di-t-butyl peroxyhexane or di-t-butyl peroxide are used. In particular, dicumyl peroxide, cumyl-t-butyl peroxide, 2,5-dimethyl-2,5-di-t-butyl peroxyhexane, and di-t-butyl peroxide are preferable, because they give low permanent compressive strain.

These organic peroxide vulcanizing agents can be used alone or as a mixture of the two or more kinds. The blending amount of the organic peroxide as the curing agent is generally within a range of 0.05 to 10 parts by weight relative to 100 parts by weight of component (A) as the silicone base polymer.

On the other hand, with respect to a curing agent used when the cross-linking through addition reaction is adopted, as a curing catalyst, a platinum catalyst such as chloroplatinic acid, platinum olefin complex, platinum vinyl siloxane complex, platinum black or platinum triphenylphosphine complex is used, and as a cross-linking agent, a polydiorganosiloxane in which the average number of hydrogen atoms bound to silicon atom is more than 2 in one molecule is used. The blending amount of the curing catalyst in the addition reaction curing agent is preferably within a range of 0.1 to 1000 ppm relative to component (A) as the base polymer in terms of the platinum element amount. When the blending amount of the curing catalyst is less than 0.1 ppm in terms of the platinum element amount, the curing does not sufficiently proceed, whereas even when the amount is more than 1000 ppm, further increase of the curing speed is not especially expected. In addition, the blending amount of the cross-linking agent is preferably such an amount that the number of hydrogen atoms bound to silicon atom in the cross-linking agent is from 0.5 to 4.0 per alkenyl group in component (A), more preferably such an amount that the number is from 1.0 to 3.0. When the number of the hydrogen atoms is less than 0.5, the curing of the composition does not sufficiently proceed, and thus the hardness of the cured composition becomes lower, whereas when the number of the hydrogen atoms is more than 4.0, the physical properties and the heat resistance of the cured composition are deteriorated.

Examples of the reinforcing silica, which is component (B) of the invention, include dry silica such as aerosol silica or arc silica; wet silica such as precipitated silica or silica aerogel; hydrophobic silica which is obtained by treating the silica described above with an organic silicon compound such as hexamethyldisilazane, trimethylchlorosilane, dimethyldichlorosilane, trimethylmethoxysilane or octamethylcyclotetrasiloxane, and the like, and the aerosol silica and the hydrophobized silica thereof are preferable. In order to obtain a high reinforcing effect, reinforcing silica having a specific surface area of typically 50 $m^2/g$ or more, preferably 100 to 700 $m^2/g$, more preferably 130 to 500 $m^2/g$ is used.

Component (B) as the reinforcing silica is blended in an amount of 1 to 100 parts by weight relative to 100 parts by weight of component (A). When the amount is less than one part by weight, the reinforcement is not sufficiently improved, whereas when the amount is more than 100 parts by weight, it is difficult to perform the blending and physical properties of the rubber are also affected.

The present invention is characterized by adding 0.05 to 80 ppm of the (C) ionic liquid whose anion component is bis(trifluoromethanesulfonyl)imide, when the (A) polyorganosiloxane base polymer and the (B) reinforcing silica are mixed together.

Ionic liquid whose component is not bis(trifluoromethanesulfonyl)imide is inferior in the effect aimed at by the present invention. Further, it can be considered to add a solid ionic substance whose anionic component is bis(trifluoromethanesulfonyl)imide, but in this case, not only is it disadvantageously necessary to add a larger amount of the substance for obtaining the same effects as those obtained in the case of using the ionic liquid, but also it is difficult to obtain a stable quality, because of its low dispersibility. In addition, because many of the substances are water-soluble, disadvantageously, the compound has a problem of being plasticized again due to moisture absorption.

Preferable examples of the ionic liquid whose anionic component is bis(trifluoromethanesulfonyl)imide include 1-butyl-3-methylimidazolium.bis(trifluoromethanesulfonyl)imide, 1,2-dimethyl-3-propylimidazolium.bis-(trifluoromethanesulfonyl)imide, 1-ethyl-3-methylimidazolium.bis(trifluoromethanesulfonyl)imide, 3-methyl-1-propylpyridinium.bis(trifluoromethanesulfonyl)imide, N-butyl-3-methylpyridinium.bistrifluoromethanesulfonylimide, 1-butyl-1-methylpyrrolidinium-.bis-(trifluoromethanesulfonyl)imide, 1-vinylimidazolium-.bis-(trifluoromethanesulfonyl) imide, 1-allylimidazolium.bis-(trifluoromethanesulfonyl)imide, 1-allyl-3-methylimidazolium.bis(trifluoromethanesulfonyl)imide, and diallyldimethylammonium.bis(trifluoromethanesulfonyl)imide, which can be obtained as commercial products. Among these, N-butyl-3-methylpyridinium.bistrifluoromethanesulfonylimide, 1-butyl-1-methylpyrrolidinium.bis-(trifluoromethanesulfonyl)imide, diallyldimethylammonium.bis(trifluoromethanesulfonyl)imide are particularly preferable.

The blending amount of component (C) is from 0.05 to 80 ppm. When the amount is less than 0.05 ppm, sufficient effects cannot obtained, whereas even when an amount of more than 80 ppm is blended, there arise problems that the effects reach saturation, properties inherent to the silicone rubber cannot be maintained, and moreover this situation is not commercially viable.

The particularly preferable blending amount is 20 ppm or less.

Component (C) may be simultaneously added while the (A) polyorganosiloxane base polymer and the (B) reinforcing silica are mixed together, or after component (A) and component (B) are mixed together, component (C) may be added thereto and mixed therewith. The former is more advantageous from the viewpoint of compatibility with the polyorganosiloxane base polymer as component (A).

EXAMPLES

The present invention will be described in more detailed by means of Examples below.

Example 1

In a 5 L-volume kneader (a twin-screw mixer), 200 grams of a (B) dry silica (manufactured by Nippon Aerosil Co., Ltd.) having a specific surface area of 150 $m^2/g$, and 8 ppm, relative to component (A), of (C) N-butyl-3-methylpyridinium.bis(trifluoromethanesulfonyl)imide were blended with 1800 grams of a (A) vinyl group-containing polydimethylorganosiloxane having an average degree of polymerization of 5000 and 0.20% by mole of methylvinylsiloxane units at a temperature of 23° C. and a humidity of 40% to obtain a silica-blend silicone rubber compound. Silica was added separately and blended in five batches. The total amount of the compound obtained was filtered through a 200-mesh filter in an extruder.

After that, 20 grams of a dangerous substance hexamethyldisilazane, which was a surface modifier for silica, was added, which was mixed for 30 minutes. At this time, the kneader was not substituted with nitrogen, and the number of revolutions of the kneader was 20 rpm. The light was turned off, and whether ignition during the mixing occurred or not was visually confirmed.

The same procedure was repeated three times, and ignition could not be confirmed in all of the three times.

After that, the mixture was heated and mixed for 2 hours at 150° C. to provide a heat curing silicone rubber compound. Next, guides were attached to two 6-inch rolls, to which the total amount of the compound was added, and the compound was treated with the rolls for 30 minutes, during which 1.0 part of a vulcanizing agent (TC-8 in which 2,5-dimethyl-2,5-di-t-butyl peroxyhexane was included in a content of 50%, manufactured by Momentive Performance Material Japan Inc.) was blended therewith. At that time, a pair potential of the compound was measured five times using a vibrating electrode type surface electrometer (manufactured by Kasuga Electric Works Corp.), from the distance predetermined by the electrometer. The minimum potential was 0 KV, and the maximum potential was −8 KV, which showed a state in which foreign substances such as dust hardly adhered.

After the series of procedures were performed, press valcanization was performed for 10 minutes at 170° C., and then secondary valcanization was performed for 4 hours at 200° C. After that, foreign substances included in the rubber were confirmed with a laser microscope. More than one micrometer-dust was not observed in the sheet 20 cm×20 cm, having a thickness of 6 mm.

Example 2

The test was performed in the same manner as in Example 1, except that 8 ppm of 1-butyl-1-methylpyrrolidinium.bis-(trifluoromethanesulfonyl)imide was added instead of N-butyl-3-methylpyridinium.bis(trifluoromethanesulfonyl)imide.

Ignition was not observed while the mixture was kneaded in the kneader.

When a pair potential of the compound was measured, it was found that the minimum potential was 0 KV, and the maximum potential was −7 KV, which showed a state in which dust and the like hardly adhered. Foreign substances included in the cured rubber were confirmed with a laser microscope. More than one micrometer-dust was not observed.

Example 3

The test was performed in the same manner as in Example 1, except that 5 ppm of diallyldimethylammonium.bis-(trifluoromethanesulfonyl)imide was added instead of N-butyl-3-methylpyridinium.bis(trifluoromethanesulfonyl)imide. Ignition was not observed while the mixture was kneaded in the kneader.

When a pair potential of the compound was measured, it was found that the minimum potential was 0 KV, and the maximum potential was −6 KV, which showed a state in which dust and the like hardly adhered. In addition, foreign substances included in the cured rubber were confirmed with a laser microscope in the same manner as in Example 1. More than one micrometer-dust was not observed.

Comparative Example 1

The same procedure as Example 1 was performed except that component (C) was not blended, and whether ignition occurred or not was confirmed. The ignition was observed three times out of three, and thus the following test was stopped.

Comparative Example 2

A composition having the same composition as prepared in Example 1 was prepared except that component (C) was not blended. However, purging with nitrogen was performed and an oxygen concentration was adjusted to 2% or less before adding hexamethyldisilazane, and then the silazane was added. Ignition was not observed three times out of three. After that, a compound was obtained in the same manner as in Example 1, and a pair potential was measured about five times. The minimum potential was −8 KV, and the maximum potential was −46 KV, which showed a state in which dust and the like easily adhered.

Next, a sheet was produced in the same manner as in Example 1, and foreign substances were confirmed with a laser microscope. In the sheet 20 cm×20 cm, having a thickness of 6 mm, about one-micrometer dusts were observed at 11 different portions. It seems that inclusion of dusts took place during the filtering procedure, rolling procedure and forming procedure of the rubber sheet.

Comparative Example 3

The test was performed in the same manner as in Example 1, except that 8 ppm of 1-butyl-3-methylpyridin-1-iumtrifluoromethanesulfonate was added instead of N-butyl-3-methylpyridinium.bis(trifluoromethanesulfonyl)imide. Ignition was observed three times out of three when the mixture was kneaded in the kneader, and thus the following test was stopped.

The invention claimed is:

1. A heat curing silicone rubber compound composition comprising:
    (A) 100 parts by weight of a polyorganosiloxane base polymer;
    (B) 1 to 100 parts by weight of a reinforcing silica; and
    (C) 0.05 to 80 ppm of an ionic liquid whose anionic component is bis(trifluoromethanesulfonyl)imide, prepared by adding component (C) when component (A) and component (B) are mixed together with each other.

2. The heat curing silicone rubber compound composition according to claim 1, wherein component (C) is at least one selected from the group consisting of N-butyl-3-methylpyridinium.bistrifluoromethanesulfonylimide, 1-butyl-1-methylpyrrolidinium.bis-(trifluoromethanesulfonyl)imide and diallyldimethylammonium.bis(trifluoromethanesulfonyl)imide.

* * * * *